Figure 3:
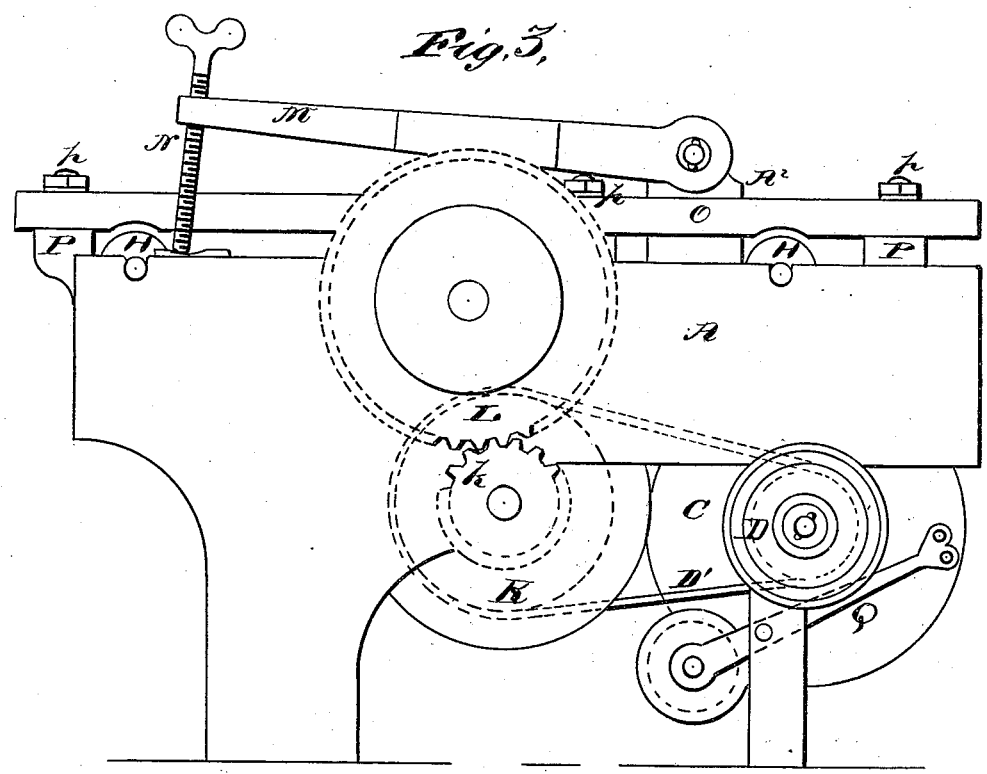

C. BLIVEN.
SAWING-MACHINE.
No. 190,540.  Patented May 8, 1877.
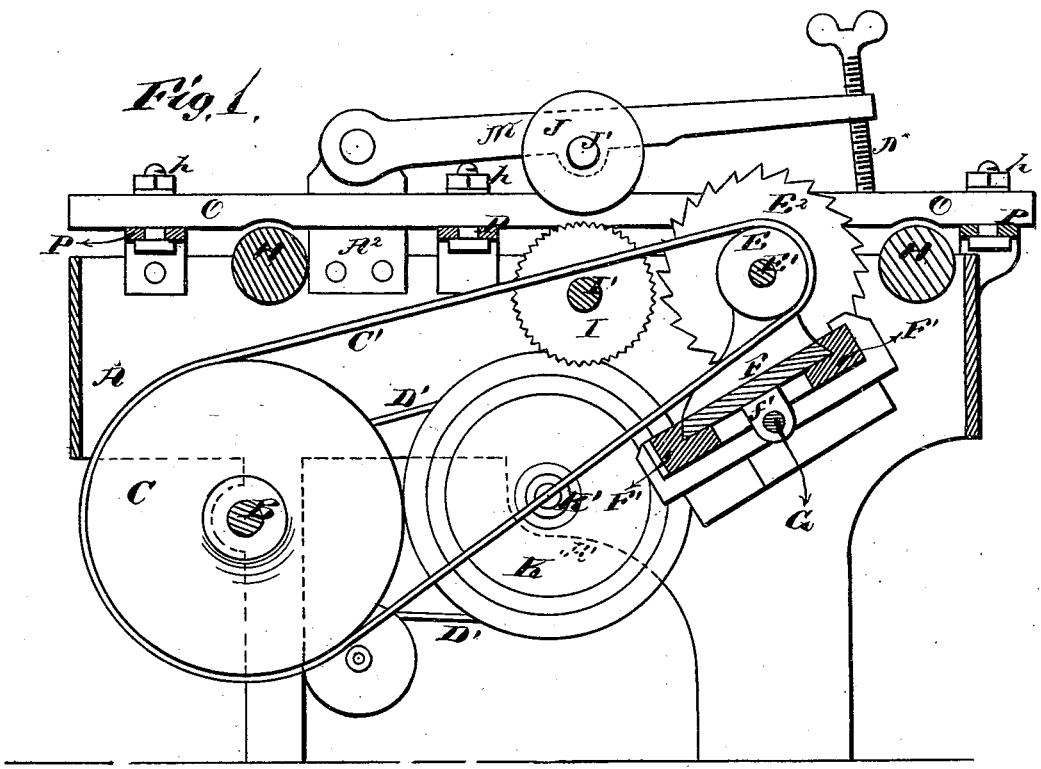
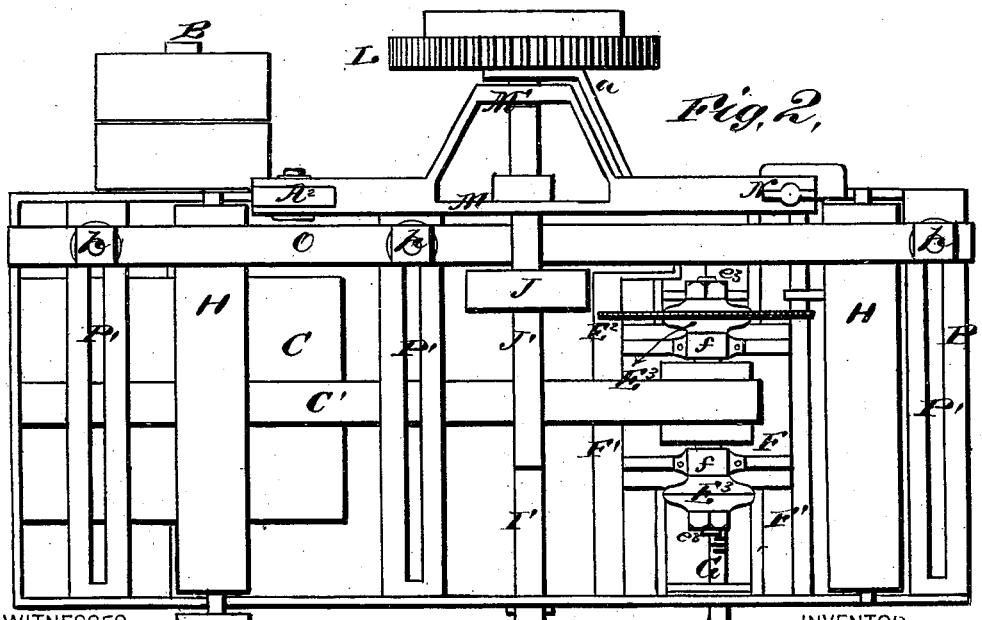

C. BLIVEN.
SAWING-MACHINE.

No. 190,540.    Patented May 8, 1877.

2 Sheets—Sheet 2.

UNITED STATES PATENT OFFICE.

CHARLES BLIVEN, OF NORFOLK, VIRGINIA, ASSIGNOR OF ONE-HALF HIS RIGHT TO WILLIAM B. ROGERS, OF SAME PLACE.

IMPROVEMENT IN SAWING-MACHINES.

Specification forming part of Letters Patent No. 190,540, dated May 8, 1877; application filed February 24, 1877.

*To all whom it may concern:*

Be it known that I, CHARLES BLIVEN, of Norfolk, in the county of Norfolk and State of Virginia, have invented a new and valuable Improvement in Sawing-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a longitudinal vertical sectional view of my sawing attachment to planing-machines, and Fig. 2 is a plan view thereof. Fig. 3 is a side elevation of the same.

This invention is an improvement on the patent granted to Charles Bliven, November 7, 1876, No. 184,136, to which reference is hereby made for a fuller description of the parts hereinafter set forth, but not claimed.

The nature of said invention consists in providing the saw-arbor with saw-holding devices at each end, and in certain adjusting devices hereinafter particularly set forth.

In the accompanying drawings, A designates the supporting-frame of the machine, and B designates the driving-shaft journaled therein, and carrying a large drum or cylinder, C, and a small drum, D. Drum C communicates motion by means of an endless belt, C', to a pulley or belt-wheel, E, on a saw-arbor, $E^1$, carrying a saw, $E^2$. Said arbor turns in bearings $ff$ on a small supporting-frame, F, the base-plate of which slides laterally in grooves of two guide-bars, F' F', which extend across main frame A, and are rigidly secured thereto. Each end of said arbor is provided with a clutch or double collar, $E^3$, and a nut, $e^2$, for clamping said saw $E^2$. Each double collar consists of two divisions, between which the said saw is placed, the nut $e^3$ being afterward screwed home. By means of these devices the saw $E^2$ may be firmly and readily attached to either end of said arbor. The said saw is also laterally adjustable by means of a screw-threaded rod or shaft, G, which operates a screw-tapped lug, $f'$, on the bottom of frame F. Said adjusting rod or shaft G is extended through one side of frame A, and provided with an operating-crank, G', on its outer end. By means of the above devices saw $E^2$ may be adjusted to suit the width of lumber required.

The lumber, as fed forward, rests upon a bed of rollers, H H; and said feeding is effected by means of feed-rollers I and J, the former being fluted, stationary, (except rotation,) and arranged directly under the latter, which is smooth and vertically movable. These feed-rollers are carried respectively by shafts I' and J', and receive motion through the following mechanism: From drum D an endless belt, D', extends to a grooved wheel, K, on a short shaft, K', which is journaled in one side of frame A and in a bracket, A', attached thereto. The outer end of shaft K' carries a pinion, $k$, which engages with gear-wheel L on the outer end of shaft I', which is journaled in an arm, $a$, of said bracket or supporting-plate $A^1$.

Shaft J' is journaled in straight bearing-plate or bar M, and bent bearing-plate M', which are joined together at the ends, or formed out of one piece. One end of said united bearing-plates is pivoted to a standard, $A^2$, on the top of frame A, so as to have vertical motion; and the other end is screw-tapped, so as to be adjustable by means of adjusting-screw N, the lower end of which bears against a plate or block on frame A. The said bearings M and M' are made so strong that no support is needed for the other end of said shaft J'.

Rollers I and J may be made adjustable on their shafts. Guide-bar O, for guiding the boards while being fed is supported by slotted cross-bars P P. Said cross-bars allow said guide-bar to be adjusted over them across the top of frame A, and said guide-bar is clamped in any position of such adjustment by bolts $p\ p$, which pass down through the slots P' P' of said cross-bars.

By supporting shaft J' at one end only, the opposite side of frame A is left unoccupied, so that it may be used for supporting the lumber, the latter being piled thereon after cutting. The construction of frame F is solid and strong, so as to prevent yielding and consequent inaccuracy. Said frame may be adjusted in its supporting-guides by means of a rack and spur wheel, or other equivalent device, instead of the screw-threaded rod and screw-tapped lug hereinbefore described. There should be two sets of feeding-rollers, with suitable belt-gearing connections, for running them from the same driving-shaft.

Q designates a lever of the first kind, which is pivoted to the inside of frame A, and carries a grooved roller or pulley, that is adapted to be pressed against belt D', for the purpose of taking up slack in the same.

What I claim as new, and desire to secure by Letters Patent, is—

1. The combination, with the frame F, provided with the screw-tapped lug $f'$, and saw-arbor $E^1$, and the screw-threaded rod G, having the crank G', of the double collars $E^3 E^3$, nuts $e^3$, and saws $E^2$, substantially as described, and for the purpose set forth.

2. The combination of the feed-roller shaft J', with pivoted bearings M M', standard $A^2$, and adjusting-screw N, substantially as shown and described.

3. The adjustable guide-bar O, slotted cross-bars P, and fastening-bolts, in combination with rollers I and J, substantially as and for the purpose set forth.

In testimony that I claim the above I have hereunto subscribed my name in the presence of two witnesses.

CHARLES BLIVEN.

Witnesses:
J. HARDY HENDREN,
W. J. YOUNG.